Jan. 14, 1958     K. R. GERHART ET AL     2,820,056
ALKARYL SULFONATES
Filed July 2, 1954
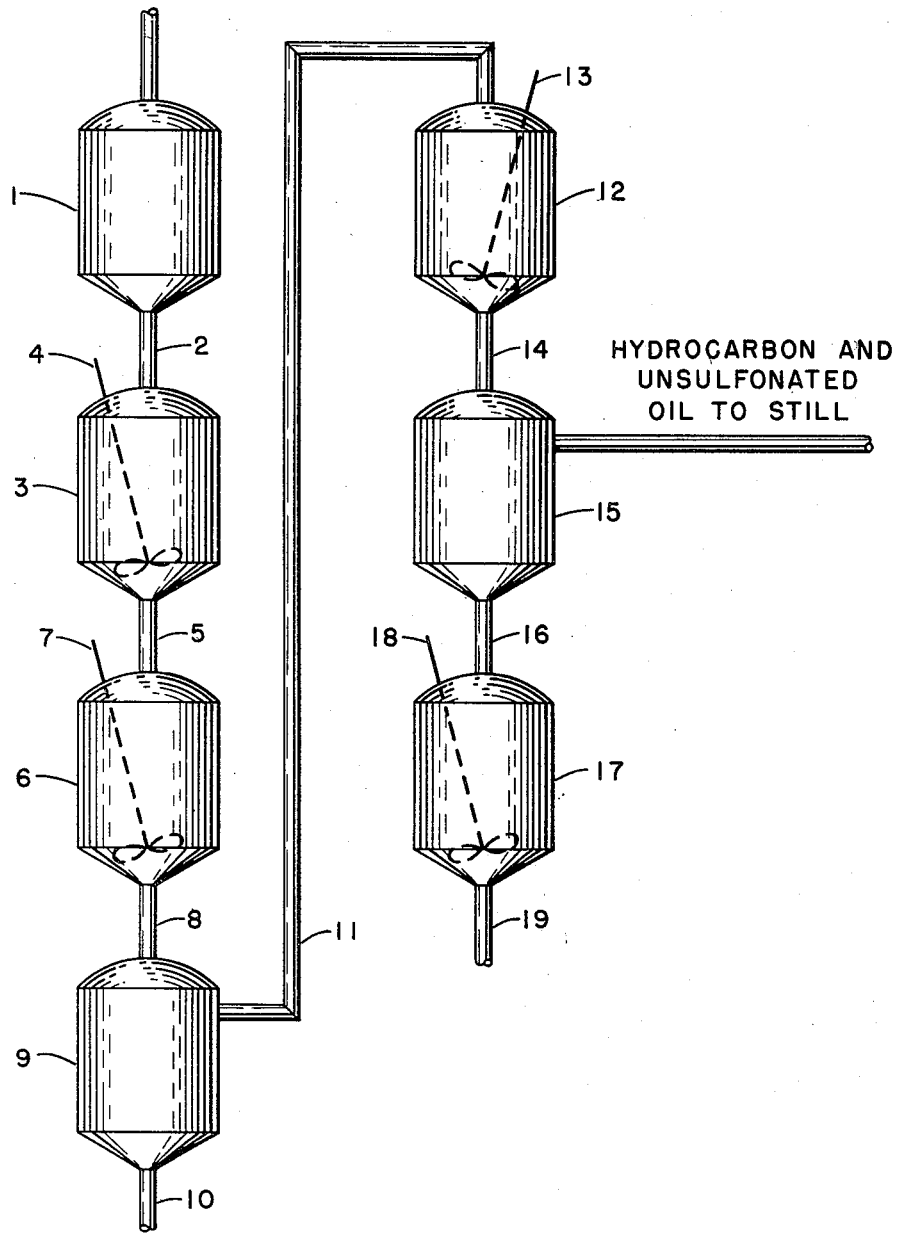
INVENTORS.
Kenneth R. Gerhart and
Edward J. Karwacki
BY
Floyd Trimble
ATTORNEY

United States Patent Office 2,820,056
Patented Jan. 14, 1958

2,820,056
ALKARYL SULFONATES

Kenneth R. Gerhart, Chicago, Ill., and Edward J. Karwacki, Baltimore, Md., assignors to Continental Oil Company, Ponca City, Okla., a corporation of Delaware Application July 2, 1954, Serial No. 440,966

1 Claim. (Cl. 260—505)

The present invention relates to alkylated aryl sulfonates and relates more particularly to the production of alkylated aryl sulfonates containing a high percentage of active ingredients.

Sulfonation of an alkaryl hydrocarbon has generally followed the procedure wherein about 1.3 to about 2.0 parts by weight of 100 to 105 percent sulfuric acid is used per part by weight of the alkaryl hydrocarbon. Upon completion of the sulfonation reaction the reaction mixture is neutralized with sodium hydroxide producing a mixture comprising sodium sulfonate, sodium sulfate, and unsulfonated oil. The sodium sulfate content of the mixture varies from about 45 to about 85 percent depending upon (1) the molecular weight of the alkaryl hydrocarbon, (2) the quantity and concentration of the sulfuric acid, and (3) the percent conversion of the alkaryl hydrocarbon. Obviously the elimination of sodium sulfate is desirable because its presence reduces the active ingredient content of the mixture. Various methods have been suggested for removing the sodium sulfate but such methods have not been satisfactory because they have involved an undesirable expenditure of materials and time. Furthermore none of these methods have been capable of reducing the sodium sulfate content below a value of about 10 percent. Another method suggested involves the addition of water to the sulfonation reaction mixture prior to neutralization. This causes the mixture to separate into two phases, a diluted sulfuric acid phase and a sulfonic acid phase. Separation, however, has not been quantitative, the diluted sulfuric acid phase retains some sulfonic acid and some sulfuric acid is retained in the sulfonic acid phase. The final result after neutralizing with sodium hydroxide is a sodium sulfate and sodium sulfonate mixture containing about 15 percent sodium sulfate. Furthermore none of the proposed methods remove the unsulfonated oil which imparts undesirable color and odor characteristics to the final sulfonated product.

It is, therefore, a principal object of this invention to provide an improved process for substantially quantitative removal of sulfuric acid from the sulfonation mixture. A further object of the present invention is to provide an improved process for the removal of unsulfonated oil from the sulfonated mixture. It is another object of our invention to provide a process by which the recovery of the sulfonated product is substantially quantitative. Further objects and advantages of the invention will be apparent to those skilled in the art from the accompanying disclosure and discussion.

The foregoing objects are attained by a process which involves in brief the following steps. An alkaryl hydrocarbon is reacted with a sulfonating agent such as sulfuric acid or oleum. Following sulfonation the product is diluted with at least 1.5 parts of a hydrocarbon such as benzene, toluene, or hexane per part of the alkaryl hydrocarbon. A sufficient quantity of water is then added to the mixture to form two layers; an upper organic layer comprising the alkaryl sulfonic acid, unsulfonated oil, and the hydrocarbon, and a lower inorganic layer comprising sulfuric acid and water. The amount of water to be added must be such that the water and the sulfuric acid will be present in proportions equivalent to aqueous sulfuric acid having a concentration within the range of 75 to 80 percent. After separating the two layers, the alkaryl sulfonic acid is recovered from the organic layer by any suitable means such as by distillation or by extraction. Of the various methods which are available we prefer solvent extraction wherein an aqueous alcoholic solution is used as the particular selective solvent. If the preferred method is used the alcoholic solution is neutralized with a base and the sulfonate is recovered in substantially pure form from the aqueous alcoholic solution.

The invention will now be described in conjunction with the accompanying drawing which is a schematic flow diagram in which is shown one arrangement of apparatus elements and flow of materials therethrough suitable for practice of the invention. In the drawing an alkaryl hydrocarbon, for example dodecylbenzene, is reacted with a sulfonating agent, for example an excess of concentrated sulfuric acid or oleum, in reactor 1. The sulfonation mixture flows from sulfonation reactor 1 via line 2 to the mixing tank 3 equipped with a stirrer 4 where a hydrocarbon such as benzene, toluene, or hexane is added. After thorough mixing the mixture flows to a second mixing tank 6 equipped with stirrer 7 via line 5 where a quantity of water is added. The mixture is agitated with stirrer 7 and then allowed to flow through line 8 to the settling chamber 9 where the liquid phases separate. The spent acid layer is discharged through line 10 and organic layer flows to the mixing tank 12 equipped with stirrer 13 via line 11 where an aqueous alcoholic solution is added. After mixing the mixture flows to settling tank 15 via line 14 where the liquid phases separate. The hydrocarbon layer containing the hydrocarbon and unsulfonated oil is removed and the hydrocarbon recovered by distillation. The alcoholic layer flows to the neutralizer 17 equipped with stirrer 18 through line 16. Aqueous sodium hydroxide is then added and after neutralization is complete the sodium sulfonate flows through line 19 to a drier.

The sulfonation step may be carried out by any of the methods described in the prior art wherein an alkaryl hydrocarbon is reacted under sulfonating conditions with a sulfonating agent. Any of the enumerated sulfonating agents listed in the prior art are satisfactory but because the final product obtained in our process, regardless of the particular sulfonating agent used, is of excellent quality, we prefer a sulfonating agent which is cheap, readily available, and easily handled. Sulfuric acid and oleum meet these criteria and for that reason are preferred. Following sulfonation the reaction mixture is diluted with about 1.5 to 4 or more parts by weight of a hydrocarbon such as benzene, toluene, or hexane per part by weight of the alkaryl hydrocarbon. A definite quantity of water is then added to the mixture which causes the formation of two layers; an upper organic layer comprising essentially the hydrocarbon, sulfonic acid, and unsulfonated oil, and a lower inorganic layer comprising principally water and spent sulfuric acid. The amount of water added at this point is very critical. It must be such that the concentration of the aqueous sulfuric acid in the lower layer falls within the range of 75 to 80 percent. If the concentration exceeds 80 percent, separation is poor because of entrainment of the spent acid in the organic layer. If on the other hand the concentration is less than 75 percent, a larger amount of sulfuric acid will be retained in the organic layer because the solubility of sulfuric acid in sulfonic acid increases as the concentration of the sulfuric acid decreases. For best results the temperature of the mixture during this step of the process should not exceed 65° C. Since considerable heat is given off when water is added to this mixture, the water prior to its addition should be cooled to about 0° C. After separating the two phases, the upper layer is extracted with an aqueous alcoholic solution which extracts the sulfonic acid. This extraction step may be carried out as a batch process or as a continuous operation. The alcoholic layer comprising essentially sulfonic acid, water, and alcohol is neutralized by the addition thereto of an aqueous caustic solution or other base such as an amine under controlled conditions so that the temperature does not exceed 50° C. While we prefer a 40 percent aqueous methanol solution, other concentrations and other water soluble aliphatic alcohols may be used. After neutralizing the alcoholic solution a substantially pure sulfonate is obtained as a residue upon evaporation of the alcohol and water.

The following examples will further illustrate specific features of the process of our invention. Parts given are parts by weight.

Example 1

To 100 parts of dodecylbenzene contained in a sulfonation reactor was slowly added 125 parts of 105 percent sulfuric acid. The mixture was stirred for about 1 hour while the temperature was maintained within a range of about 20 to 30° C. 430 parts of benzene was then added to the mixture and after a few minutes agitation 24 parts of water was added. After thorough agitation the mixture was allowed to settle for a period of 5 hours. Two liquid layers were formed and the lower layer containing the spent acid the concentration of which was 77 percent sulfuric acid, was discarded. The upper benzene layer containing the sulfonic acid and unsulfonated oil was mixed with 440 parts of 40 percent aqueous methanol solution. This mixture was allowed to stand quiescent for a short time. Two liquid layers were formed; an upper layer comprising principally benzene and unsulfonated oil and a lower layer comprising essentially water, methanol, and sulfonic acid. The lower layer was recovered and neutralized to a pH 8 by slowly adding thereto with agitation a 15 percent aqueous sodium hydroxide solution after which the resulting mixture was dried. Analysis of the dried product was as follows:

| | Percent |
|---|---|
| Sodium dodecylbenzene sulfonate | 99 |
| Sodium sulfate | 0.8 |
| Unsulfonated oil | 0.2 |

Example 2

Example 1 was repeated except that the amount of water added to the mixture was decreased slightly and as a result the concentration of the sulfuric acid in the lower layer was 77.25 percent. Analysis of the recovered dried product was as follows:

| | Percent |
|---|---|
| Sodium dodecylbenzene sulfonate | 98.92 |
| Sodium sulfate | 0.88 |
| Unsulfonated oil | 0.20 |

Example 3

Example 1 was repeated except that the amount of water added to the mixture was again decreased and as a result the concentration of the sulfuric acid in the lower layer was 84.83 percent. Analysis of the recovered dried product was as follows:

| | Percent |
|---|---|
| Sodium dodecylbenzene sulfonate | 98.76 |
| Sodium sulfate | 1.04 |
| Unsulfonated oil | 0.20 |

Example 4

Example 1 was repeated except that the amount of water added to the mixture was increased and as a result the concentration of the sulfuric acid in the lower layer was 70.23 percent. Analysis of the recovered dried product was as follows:

| | Percent |
|---|---|
| Sodium dodecylbenzene sulfonate | 98.55 |
| Sodium sulfate | 1.25 |
| Unsulfonated oil | 0.20 |

While particular embodiments of the invention have been described, it will be understood, of course, that the invention is not to be limited thereto since many variations may be made without departing from the spirit and scope of the invention. Thus, for example, other alkaryl hydrocarbons may be substituted for the dodecylbenzene in the sulfonation step. Such a substitution will be obvious as the reaction between an alkaryl hydrocarbon and a sulfonating agent is well known. Many other variations will be apparent to those skilled in the art. We, therefore, intend to be limited only in accordance with the following patent claim.

We claim:

A method of producing an alkaryl sulfonate substantially free of inorganic salts which comprises reacting an alkaryl hydrocarbon with a sulfonating agent selected from the class consisting of sulfuric acid and oleum under sulfonating conditions, diluting the resulting alkaryl sulfonic acid reaction mixture with at least 1.5 parts by weight of an organic solvent selected from the group consisting of hexane, benzene, and toluene per part by weight of said alkaryl hydrocarbon, adding water thereto thus forming two layers, an upper organic layer comprising the alkaryl sulfonic acid, unsulfonated oil, and the organic solvent, and a lower inorganic layer comprising sulfuric acid and water wherein the amount of added water is sufficient to reduce the concentration of the sulfuric acid in said inorganic layer to within the range of 75-80 percent, separating the organic layer from the inorganic layer, recovering said sulfonic acid from said organic layer by extraction with an aqueous alcoholic solution, neutralizing said sulfonic acid and then recovering the alkaryl sulfonate.

References Cited in the file of this patent

UNITED STATES PATENTS

| | | |
|---|---|---|
| 2,524,086 | Schmerling | Oct. 3, 1950 |
| 2,573,675 | Bloch et al. | Nov. 6, 1951 |
| 2,652,427 | Shultz | Sept. 15, 1953 |
| 2,655,530 | Nevison | Oct. 13, 1953 |